(12) United States Patent
Kojima (10) Patent No.: US 11,585,238 B2
(45) Date of Patent: Feb. 21, 2023

(54) BEARING DEVICE AND TURBOCHARGER INCLUDING THE SAME

(71) Applicant: MITSUBISHI HEAVY INDUSTRIES ENGINE & TURBOCHARGER, LTD., Sagamihara (JP)

(72) Inventor: Yuya Kojima, Tokyo (JP)

(73) Assignee: MITSUBISHI HEAVY INDUSTRIES ENGINE & TURBOCHARGER, LTD., Sagamihara (JP)

(*) Notice: Subject to any disclaimer, the term of this patent is extended or adjusted under 35 U.S.C. 154(b) by 0 days.

(21) Appl. No.: 17/312,290

(22) PCT Filed: Jan. 7, 2019

(86) PCT No.: PCT/JP2019/000113
§ 371 (c)(1),
(2) Date: Jun. 9, 2021

(87) PCT Pub. No.: WO2020/144733
PCT Pub. Date: Jul. 16, 2020

(65) Prior Publication Data
US 2022/0106891 A1    Apr. 7, 2022

(51) Int. Cl.
*F01D 25/16* (2006.01)
*F16C 17/04* (2006.01)

(52) U.S. Cl.
CPC ............ *F01D 25/168* (2013.01); *F16C 17/04* (2013.01); *F05D 2220/40* (2013.01); *F05D 2240/52* (2013.01)

(58) Field of Classification Search
CPC .... F01D 25/168; F16C 17/04; F05D 2220/40; F05D 2240/52
See application file for complete search history.

(56) References Cited

U.S. PATENT DOCUMENTS

| | | |
|---|---|---|
| 3,390,926 A | 7/1968 | Woollenweber |
| 2008/0137229 A1 | 6/2008 | Nakamura et al. |

(Continued)

FOREIGN PATENT DOCUMENTS

| | | |
|---|---|---|
| CN | 103842667 A | 6/2014 |
| CN | 105247243 A | 1/2016 |

(Continued)

OTHER PUBLICATIONS

International Preliminary Report on Patentability and Written Opinion of the International Searching Authority for International Application No. PCT/JP2019/000113, dated Jul. 22, 2021, with English translation of the Written Opinion.

(Continued)

*Primary Examiner* — Jacob M Amick
*Assistant Examiner* — Charles J Brauch
(74) *Attorney, Agent, or Firm* — Birch, Stewart, Kolasch & Birch, LLP (57) ABSTRACT

A bearing device includes a rotary part which is configured to be rotatable about a rotational axis and has a rotary surface intersecting the rotational axis, and a stationary part which has a stationary surface facing the rotary surface. One of the rotary surface or the stationary surface includes a bearing surface part for forming a bearing oil film. The rotary surface includes a first inner circumferential region, and a first outer circumferential region facing the stationary surface on a radially outer side of the bearing surface part and having higher oleophobicity than the first inner circumferential region.

10 Claims, 9 Drawing Sheets

(56) References Cited

U.S. PATENT DOCUMENTS

2014/0126846 A1    5/2014  Kurimura
2014/0233873 A1*   8/2014  Hayashi ................ F16C 17/047
                                                          384/123

FOREIGN PATENT DOCUMENTS

| DE | 6608771 U | 11/1971 | | |
|----|-----------|---------|---|---|
| JP | 2002-310143 A | 10/2002 | | |
| JP | 2002310143 A | * 10/2002 | | |
| JP | 2002-349551 A | 12/2002 | | |
| JP | 2007-192330 A | 8/2007 | | |
| JP | 2007192330 A | * 8/2007 | ............. | F16C 33/62 |
| JP | 2008-157444 A | 7/2008 | | |
| JP | 2008-298097 A | 12/2008 | | |
| JP | 2009-8160 A | 1/2009 | | |
| JP | 4556621 B2 | 10/2010 | | |
| JP | 2012-45841 A | 3/2012 | | |
| JP | 2014-177072 A | 9/2014 | | |
| JP | 2015-183799 A | 10/2015 | | |
| JP | 2015183799 A | * 10/2015 | | |
| WO | WO 2013/099600 A1 | 7/2013 | | |
| WO | WO-2014190360 A1 | * 11/2014 | ........... | F16H 7/1218 |

OTHER PUBLICATIONS

International Search Report for International Application No. PCT/JP2019/000113, dated Mar. 26, 2019.
The Office Action dated May 10, 2022, issued in counterpart DE application No. 11 2019 005 832.0.
Office Action dated Jul. 1, 2022 issued in counterpart Chinese Application No. 201980087554.0 with an English Translation.

* cited by examiner

BEARING DEVICE AND TURBOCHARGER INCLUDING THE SAME

TECHNICAL FIELD

The present disclosure relates to a bearing device and a turbocharger including the same.

BACKGROUND

In a bearing device rotatably supporting a rotational shaft by a bearing oil film, since oil flow forming the bearing oil film may lead to a reduction in bearing load, an attempt to suppress such oil flow has been made.

For example, Patent Document 1 describes that in a fluid dynamic bearing where a lubricating fluid film is formed between a rotational shaft and a stationary member, in order to reduce leakage of the lubricating fluid, an oil repellent film is formed in a section, of the respective surfaces of the rotational shaft and the stationary member, adjacent to the lubricating fluid film.

CITATION LIST

Patent Literature

Patent Document 1: JP4556621B

SUMMARY

Technical Problem

Meanwhile, in a thrust bearing for supporting a thrust load by an oil film, if oil, which forms a bearing oil film between a rotary surface (for example, a surface of a thrust collar) rotating with a rotational shaft and a stationary surface (for example, a surface of a bearing plate) facing the rotary surface, flows radially outward by a centrifugal force (that is, side flow occurs), a load capacity of a bearing device may be decreased. Thus, in order to reduce the side flow leading to the decrease in load capacity, a space (weir) interposed between the rotary surface and the stationary surface may be disposed on an outer peripheral side of a bearing surface. Disposing the space, it is expected to be able to reduce the above-described side flow. On the other hand, however, in a case where such space is formed, an area of a narrow gap interposed between the rotary surface and the stationary surface increases, and thus if oil exists in the space, a bearing loss caused by a friction between the oil and the rotary surface may be increased.

Therefore, in general, it is considered difficult to achieve both of increasing the load capacity of the bearing device and reducing the bearing loss. In this regard, Patent Document 1 does not describe improving the load capacity of the bearing device while reducing the bearing loss.

In view of the above, an object of at least one embodiment of the present invention is to provide a bearing device capable of achieving both of a reduction in bearing loss and an increase in load capacity, and a turbocharger including the same.

Solution to Problem (1) A bearing device according to at least one embodiment of the present invention includes a rotary part which is configured to be rotatable about a rotational axis and has a rotary surface intersecting the rotational axis, and a stationary part which has a stationary surface facing the rotary surface. One of the rotary surface or the stationary surface includes a bearing surface part for forming a bearing oil film. The rotary surface includes a first inner circumferential region, and a first outer circumferential region facing the stationary surface on a radially outer side of the bearing surface part and having higher oleophobicity than the first inner circumferential region.

In the bearing surface part of the bearing device, as the amount of oil flowing in the rotational direction along with a rotation of the rotary surface increases, a load capacity of the bearing improves. On the other hand, a bearing loss caused by a friction of the rotary surface and the oil is in proportion to a velocity gradient of the oil.

In this regard, in the above configuration (1), oleophobicity in the first outer circumferential region of the rotary surface facing the stationary surface on the radially outer side of the bearing surface part is made higher than that in the first inner circumferential region. Thus, in the first outer circumferential region, the velocity of the oil in the vicinity of the rotary surface is reduced, making it possible to reduce side flow (oil leakage) by a centrifugal force, and thus the amount of the oil flowing in the rotational direction in the bearing surface part is easily maintained, making it possible to increase the load capacity of the bearing, as well as energy from the rotary surface is hardly transmitted to the oil in the vicinity of the rotary surface in the first outer circumferential region, making it possible to reduce the velocity gradient of the oil. Thus, it is possible to reduce the bearing loss by the friction. Accordingly, with the above configuration (1), it is possible to increase the load capacity of the bearing device while reducing the bearing loss.

(2) In some embodiments, in the above configuration (1), the bearing device satisfies $G1 \leq G2$, where G1 is a size of a gap between the rotary surface and the stationary surface at a first position in a radial range of the first outer circumferential region, and G2 is a size of a gap between the rotary surface and the stationary surface at a second position in a radial range of the bearing surface part.

With the above configuration (2), since the size G1 of the gap between the rotary surface and the stationary surface at the first position in the radial range of the first outer circumferential region is set not greater than the size G2 of the gap at the second position in the radial range of the bearing surface part, it is possible to reduce outflow (above-described side flow) of the oil from the first outer circumferential region to the radially outer side more reliably. Thus, it is possible to increase the load capacity of the bearing device.

(3) In some embodiments, in the above configuration (1) or (2), the first inner circumferential region of the rotary surface is disposed to be adjacent to the bearing oil film in an axial direction.

With the above configuration (3), since the first inner circumferential region is disposed to be adjacent to the bearing oil film in an axial direction, with the highly oleophobic first outer circumferential region located on the radially outer side of the first inner circumferential region, as described above in the above configuration (1), it is possible to reduce side flow of the oil and to reduce the velocity gradient of the oil in the first outer circumferential region. Thus, it is possible to increase the load capacity of the bearing device while reducing the bearing loss.

(4) In some embodiments, in any one of the above configurations (1) to (3), in the bearing surface part of the rotary surface or in a portion of the rotary surface facing the bearing surface part, a percentage of an area which is occupied by a portion having lower oleophobicity than the first outer circumferential region is at least 75%.

With the above configuration (4), since, of the rotary surface, a large part of the bearing surface part or the portion facing the bearing surface part has relatively low oleophobicity, the flow of the oil in the rotational direction is hardly impaired in this region. Thus, the amount of the oil flowing in the rotational direction is ensured in the bearing surface part, making it possible to effectively suppress a decrease in load capacity of the bearing.

(5) In some embodiments, in any one of the above configurations (1) to (4), the first outer circumferential region includes an oleophobic film disposed on a surface of the rotary surface.

With the above configuration (5), disposing the oleophobic film on the surface of the rotary surface, it is possible to give oleophobicity to the first outer circumferential region, and thus, as described above in the above configuration (1), it is possible to reduce side flow of the oil and to reduce the velocity gradient of the oil in the first outer circumferential region. Thus, it is possible to increase the load capacity of the bearing device while reducing the bearing loss.

(6) In some embodiments, in the above configuration (5), the oleophobic film includes a plurality of first protruding portions protruding in the axial direction, and a ratio $P1/h1$ of a pitch $P1$ of the plurality of first protruding portions to a height $h1$ of the plurality of first protruding portions is at least 1.0 and at most 2.0.

With the above configuration (6), since the plurality of first protruding portions are formed on the surface of the oleophobic film, and the ratio $P1/h1$ of the pitch $P1$ to the height $h1$ of the first protruding portions is set at least 1.0 and at most 2.0, it is possible to effectively reduce side flow and to effectively reduce the velocity gradient of the oil in the first outer circumferential region.

(7) In some embodiments, in the above configuration (6), of the oleophobic film, a percentage of an area occupied by the plurality of first protruding portions is at least 1% and at most 20%.

With the above configuration (7), since the percentage of the area of the oleophobic film occupied by the plurality of first protruding portions is set at at least 1% and at most 20%, it is possible to reduce side flow more effectively and to reduce the velocity gradient of the oil in the first outer circumferential region more effectively.

(8) In some embodiments, in any one of the above configurations (1) to (7), the stationary surface includes a second inner circumferential region, and a second outer circumferential region facing the rotary surface on a radially outer side of the bearing surface part and having higher lipophilicity than the second inner circumferential region.

With the above configuration (8), since, of the stationary surface, the second outer circumferential region facing the rotary surface on the radially outer side of the bearing surface part has lipophilicity, the oil is easily collected in the second outer circumferential region. The oil thus collected in the second outer circumferential region functions as a wall for blocking the flow of the oil trying to flow out of the bearing surface part radially outward. Thus, the amount of the oil flowing in the rotational direction is ensured in the bearing surface part, making it possible to effectively suppress the decrease in load capacity of the bearing.

(9) In some embodiments, in the above configuration (8), the second outer circumferential region includes a plurality of second protruding portions protruding in the axial direction, a ratio $P2/h2$ of a pitch $P2$ of the plurality of second protruding portions to a height $h2$ of the plurality of second protruding portions is at least 1.0 and at most 2.0.

With the above configuration (9), since the plurality of second protruding portions are formed on the surface of the second outer circumferential region, and the ratio $P1/h2$ of the pitch $P2$ to the height $h2$ of the second protruding portions is set at least 1.0 and at most 2.0, it is possible to give lipophilicity to the second outer circumferential region. Thus, as described above in the above configuration (8), the amount of the oil flowing in the rotational direction is ensured in the bearing surface part, making it possible to effectively suppress the decrease in load capacity of the bearing.

(10) In some embodiments, in the above configuration (8) or (9), the second outer circumferential region includes a lipophilic film disposed on a surface of the stationary surface.

With the above configuration (10), disposing the lipophilic film on the surface of the stationary surface, it is possible to give lipophilicity to the second outer circumferential region. Thus, as described above in the above configuration (8), the amount of the oil flowing in the rotational direction is ensured in the bearing surface part, making it possible to effectively suppress the decrease in load capacity of the bearing.

(11) A turbocharger according to at least one embodiment of the present invention includes the bearing device according to any one of the above configurations (1) to (10), a rotational shaft rotatably supported by the bearing device, and a compressor impeller and a turbine impeller disposed on the rotational shaft.

In the above configuration (11), oleophobicity in the first outer circumferential region of the rotary surface facing the stationary surface on the radially outer side of the bearing surface part is made higher than that in the first inner circumferential region. Thus, in the first outer circumferential region, the velocity of the oil in the vicinity of the rotary surface is reduced, making it possible to reduce side flow (oil leakage) by a centrifugal force, and thus the amount of the oil flowing in the rotational direction in the bearing surface part is easily maintained, making it possible to increase the load capacity of the bearing, as well as energy from the rotary surface is hardly transmitted to the oil in the vicinity of the rotary surface in the first outer circumferential region, making it possible to reduce the velocity gradient of the oil. Thus, it is possible to reduce the bearing loss by the friction. Accordingly, with the above configuration (11), it is possible to increase the load capacity of the bearing device while reducing the bearing loss.

Advantageous Effects

According to at least one embodiment of the present invention, a bearing device capable of achieving both of a reduction in bearing loss and an increase in load capacity, and a turbocharger including the same are provided.

DETAILED DESCRIPTION

Some embodiments of the present invention will be described below with reference to the accompanying drawings. It is intended, however, that unless particularly identified, dimensions, materials, shapes, relative positions and the like of components described or shown in the drawings as the embodiments shall be interpreted as illustrative only and not intended to limit the scope of the present invention.

Figure 1:
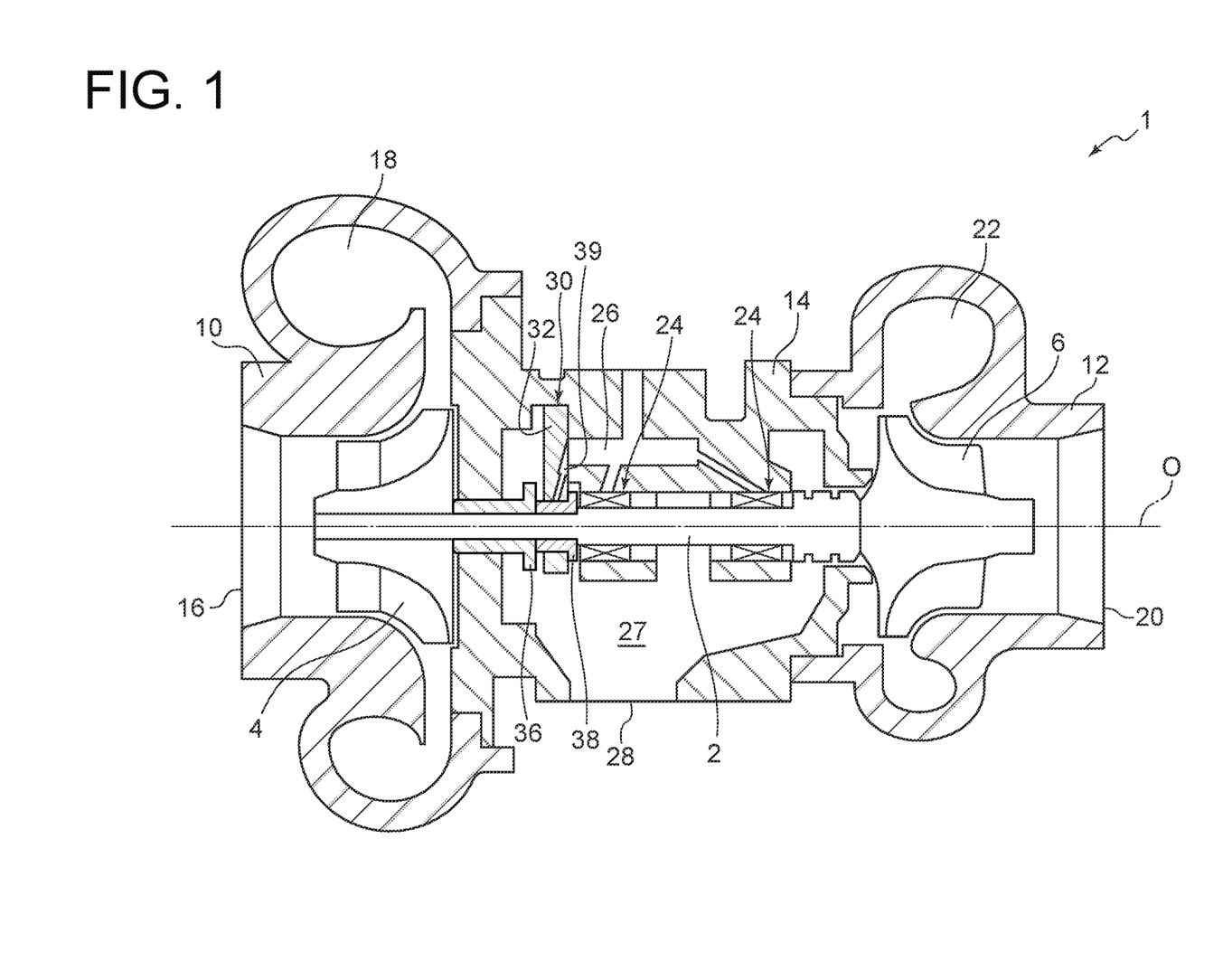
FIG. 1 is a schematic cross-sectional view of a turbocharger according to an embodiment.

First, a turbocharger including a bearing device according to an embodiment will be described with reference to FIG. 1. FIG. 1 is a schematic cross-sectional view of the turbocharger according to an embodiment. As shown in the drawing, a turbocharger 1 according to an embodiment includes a rotational shaft 2, a compressor impeller 4 disposed in one end portion of the rotational shaft 2, a turbine impeller 6 disposed in another end portion of the rotational shaft 2, and a radial bearing device 24 and a thrust bearing device 30 for rotatably supporting the rotational shaft 2. The radial bearing device 24 and the thrust bearing device 30 (bearing device) are each located between the compressor impeller 4 and the turbine impeller 6 in the axial direction of the rotational shaft 2.

Moreover, the turbocharger 1 includes a compressor housing 10 for surrounding the compressor impeller 4, a turbine housing 12 for surrounding the turbine impeller 6, and a bearing housing 14 located between the compressor housing 10 and the turbine housing 12 in the axial direction of the rotational shaft 2. The compressor housing 10 and the bearing housing 14, and the turbine housing 12 and the bearing housing 14 may be fastened by bolts (not shown), respectively.

The compressor housing 10 includes an air inlet 16 opening axially outward in one end portion of the turbocharger 1 in the axial direction, and forms an annular flow passage 18 located on the radially outer side of the compressor impeller 4.

Moreover, the turbine housing 12 includes an exhaust gas outlet 20 opening axially outward in another end portion of the turbocharger 1 in the axial direction, and forms an annular flow passage 22 located on the radially outer side of the turbine impeller 6.

The radial bearing device 24 and the thrust bearing device 30 are supplied with lubricant oil via a lubricant-oil supply passage 26 formed in the bearing housing 14. The lubricant oil leaking out of the radial bearing device 24 and the thrust bearing device 30 are discharged from an oil discharge port 28 through an oil drain space 27.

The turbocharger 1 having the above-described configuration operates as follows, for example.

Air flows into the compressor impeller 4 via the air inlet 16, and the air is compressed by the compressor impeller 4 rotating with the rotational shaft 2. The thus generated compressed air is temporarily discharged from the turbocharger 1 via the annular flow passage 18 formed on the radially outer side of the compressor impeller 4 and is supplied to a combustion engine (not shown).

In the combustion engine, a fuel is combusted with the above-described compressed air, and a combustion gas is generated by this combustion reaction. The combustion gas flows into the turbine impeller 6 via the annular flow passage 22 formed on the radially outer side of the turbine impeller 6, as an exhaust gas discharged from the combustion engine. The flow of the above-described inflow exhaust gas applies a rotational force to the turbine impeller 6, thereby driving the rotational shaft 2. The exhaust gas having finished work in the turbine is discharged from the turbocharger 1 via the exhaust gas outlet 20.

The bearing device according to some embodiments of the present invention may be the above-described thrust bearing device 30.

Next, the bearing device according to some embodiments will be described with reference to FIGS. 1 to 8B.

Figure 2:
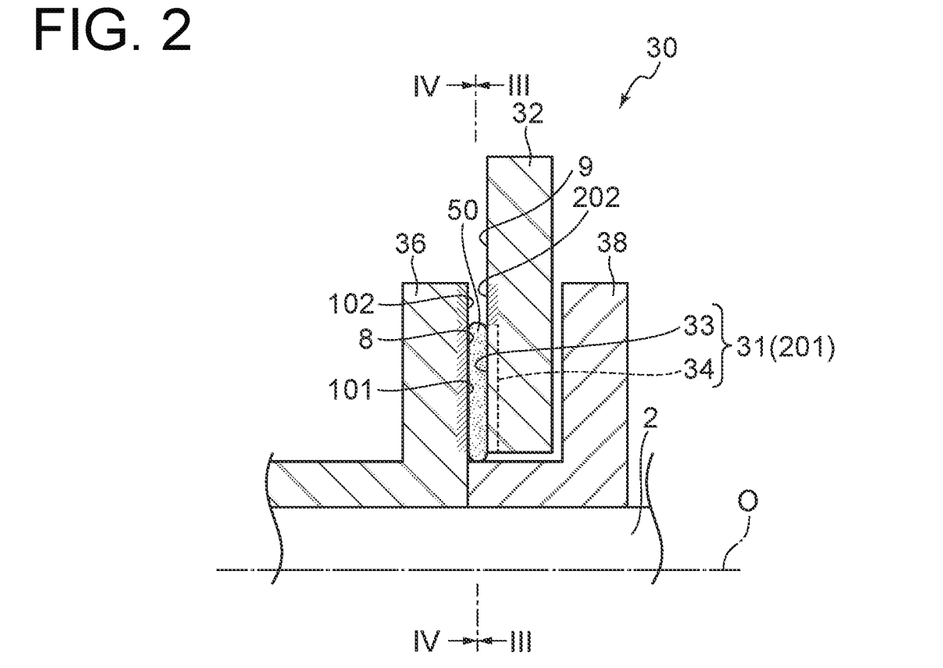
FIG. 2 is a schematic cross-sectional view taken along the axial direction of a thrust bearing device (bearing device) shown in FIG. 1.
Figure 3:
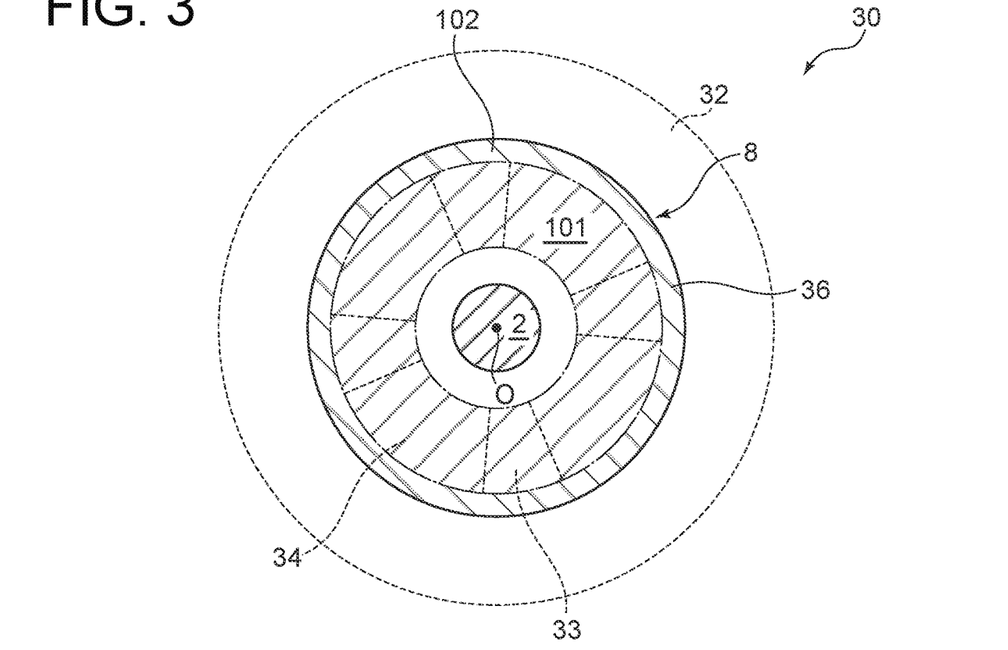
FIG. 3 is a schematic view for describing the configuration of the thrust bearing device according to an embodiment.
Figure 4:
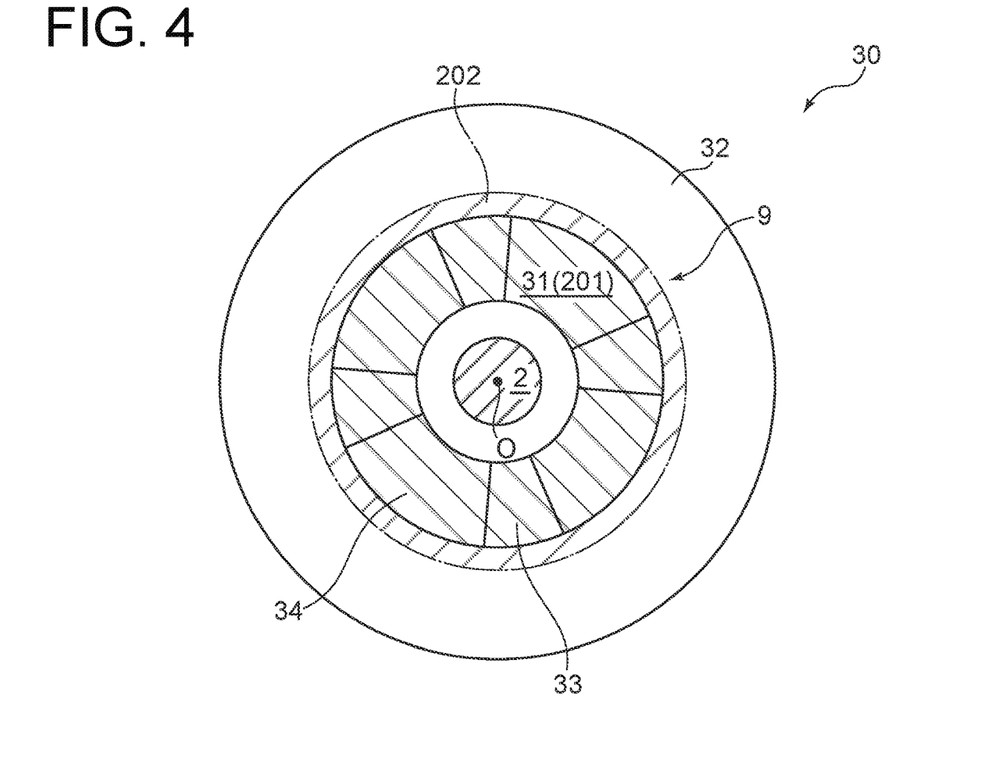
FIG. 4 is a schematic view for describing the configuration of the thrust bearing device according to an embodiment.

FIG. 2 is a schematic cross-sectional view taken along the axial direction of the thrust bearing device 30 (bearing device) shown in FIG. 1. Each of FIGS. 3 and 4 is a schematic view for describing the configuration of the thrust bearing device 30. Further, FIG. 3 is an arrow view taken along line III-III in FIG. 2, and FIG. 4 is an arrow view taken along line IV-IV in FIG. 2. Each of FIGS. 3 and 4 only shows the rotational shaft 2, a bearing plate 32, and a thrust collar 36. Moreover, diagonal lines in portions denoted by reference numerals 101, 102, 201, and 202 in FIGS. 3 and 4, do not represent cross-sections but represent regions, respectively.

As shown in FIGS. 1 and 2, the thrust bearing device 30 includes the thrust collar 36 (rotary part) rotatable about a rotational axis O of the rotational shaft 2, and the bearing plate 32 (stationary part) supported by the bearing housing 14 as a stationary member. The thrust collar 36 has a rotary surface 8 intersecting the rotational axis O. The bearing plate 32 has a stationary surface 9 facing the rotary surface 8 of the thrust collar 36. The rotary surface 8 and the stationary surface 9 typically expand along a plane orthogonal to the rotational axis O.

The stationary surface 9 of the bearing plate 32 includes a bearing surface part 31 for forming a bearing oil film 50. The bearing oil film 50 is formed at least between the rotary surface 8 and the stationary surface 9 in the axial direction. As shown in FIGS. 2 and 4, the bearing surface part 31 functions as a tapered land bearing which includes a flat land portion 33, and a tapered portion 34 axially recessed from the land portion 33 and having a slope along the circumferential direction. The bearing surface part 31 is supplied with the lubricant oil from the lubricant-oil supply passage 26 via an oil supply passage 39 (see FIG. 1; not shown in FIGS.

2-6) formed inside the bearing plate 32, and the bearing oil film 50 (see FIG. 2) is formed between the bearing surface part 31 and the rotary surface 8 of the thrust collar 36.

In the illustrated embodiment, the bearing surface part 31 is formed on the stationary surface 9 of the stationary part (the bearing plate 32 in the illustrated embodiment). However, in other embodiments, the bearing surface part may be formed on the rotary surface 8 of the rotary part.

Moreover, the bearing surface part is not limited to the above-described tapered land bearing. For example, the bearing surface part may be obtained by forming a groove or a pocket, where a bearing oil film is formed, in the stationary surface 9 or the rotary surface 8.

Moreover, as shown in FIG. 2 and the like, in the axial direction, the thrust collar 38 may be disposed on an opposite side to the thrust collar 36 across the bearing plate 32, and the bearing oil film may also be formed between the bearing plate 32 and the thrust collar 38.

As shown in FIGS. 2 and 3, the rotary surface 8 (a surface of the thrust collar 36 in the illustrated embodiment) includes the first inner circumferential region 101, and the first outer circumferential region 102 facing the stationary surface 9 on the radially outer side of the bearing surface part 31 and having higher oleophobicity than the first inner circumferential region 101.

Wetness with respect to oil, such as "oleophobicity" or "lipophilicity", in the present specification can be assessed by, for example, the magnitude relationship of a contact angle when measurement is performed by using reference sample oil. It is indicated that oleophobicity is high (that is, lipophilicity is low or wetness with respect to oil is low) as the contact angle is large, and it is indicated that oleophobicity is low (that is, lipophilicity is high or wetness with respect to oil is high) as the contact angle is small. The above-described reference sample oil may be, for example, standard lubricant oil, engine oil, or the like.

Figure 5A:
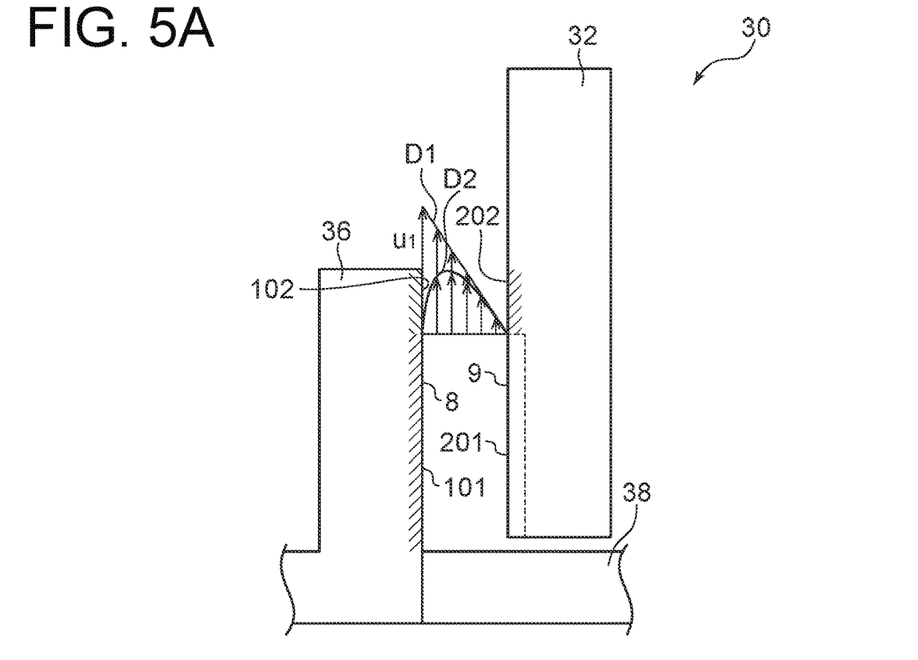
FIG. 5A is a view for describing an action by the thrust bearing device according to an embodiment.
Figure 5B:
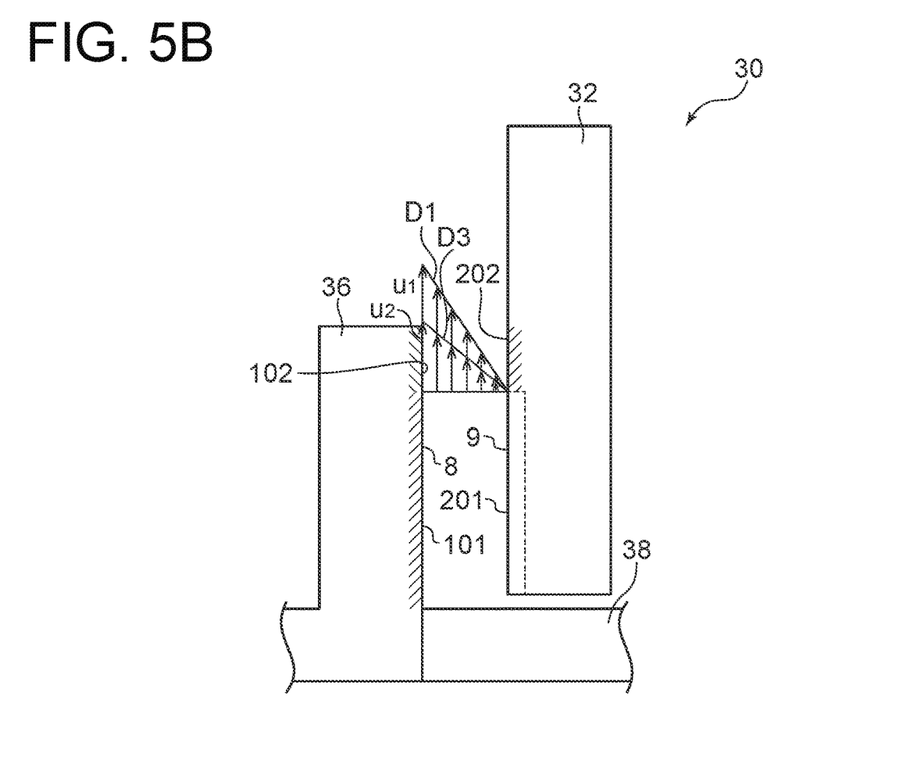
FIG. 5B is a view for describing an action by the thrust bearing device according to an embodiment.

FIGS. 5A and 5B are views for describing actions by the thrust bearing device 30 according to some embodiments, respectively. In FIGS. 5A, 5B, D1-D3 each represent a velocity distribution of oil in the axial direction. In FIGS. 5A, 5B, the bearing oil film is not illustrated.

If the above-described first outer circumferential region 102 (the region having higher oleophobicity than the first inner circumferential region 101) is not disposed in the rotary surface 8, the velocity distribution of the oil in the axial direction has a linear distribution (velocity gradient) with a velocity u1 in the rotary surface 8 and a zero velocity in the stationary surface 9, for example, as in D1 of FIG. 5A, 5B. The velocity u1 of the oil in the rotary surface 8 is a value corresponding to a rotation velocity of the rotary surface 8.

By contrast, in the above-described embodiment, disposing the above-described first outer circumferential region 102 in the rotary surface 8, oleophobicity in the first outer circumferential region 102 of the rotary surface 8 facing the stationary surface 9 on the radially outer side of the bearing surface part 31 is made higher than that in the first inner circumferential region 101. Thus, the velocity distribution of the oil in the axial direction becomes a curved distribution where a velocity in the rotary surface 8 is significantly reduced relative to u1, and the velocity becomes maximum between the rotary surface 8 and the stationary surface 9 in the axial direction, for example, as in D2 of FIG. 5A. Thus, in the first outer circumferential region 102, the velocity of the oil in the vicinity of the rotary surface 8 is reduced, making it possible to reduce side flow (oil leakage) by a centrifugal force, and thus the amount of oil flowing in a rotational direction in the bearing surface part 31 is easily maintained, making it possible to increase a load capacity of the bearing.

Moreover, in the above-described embodiment, disposing the above-described first outer circumferential region 102 in the rotary surface 8, oleophobicity in the first outer circumferential region 102 of the rotary surface 8 facing the stationary surface 9 on the radially outer side of the bearing surface part 31 is made higher than that in the first inner circumferential region 101. Thus, the velocity distribution of the oil in the axial direction has a linear distribution (velocity gradient) with a velocity u2 (note that u2 is less than u1) in the rotary surface 8 and the zero velocity in the stationary surface 9, for example, as in D3 of FIG. 5B, and the oil velocity is less than that in the case of D1 in the entire region in the axial direction. Thus disposing the first outer circumferential region 102 having relatively high oleophobicity, energy from the rotary surface 8 is hardly transmitted to the oil in the vicinity of the rotary surface 8 in the first outer circumferential region 102, making it possible to reduce the velocity gradient of the oil. Since a friction in the surface of the rotary surface 8 is in proportion to the velocity gradient of the oil, the friction is reduced by the reduction in velocity gradient described above, making it possible to reduce a bearing loss by the friction.

Therefore, according to the above-described embodiment, since the first outer circumferential region 102, which faces the stationary surface 9 on the radially outer side of the bearing surface part 31 and has higher oleophobicity than the first inner circumferential region 101, is disposed in the rotary surface 8, it is possible to increase the load capacity of the thrust bearing device 30 while reducing the bearing loss.

In some embodiments, as shown in FIG. 2, the first inner circumferential region 101 of the rotary surface 8 is disposed to be adjacent to the bearing oil film 50 in the axial direction.

In this case, as described above, with the highly oleophobic first outer circumferential region 102 located on the radially outer side of the first inner circumferential region 101, it is possible to reduce side flow of the oil and to reduce the velocity gradient of the oil in the first outer circumferential region 102. Thus, it is possible to increase the load capacity of the thrust bearing device 30 while reducing the bearing loss.

In the embodiments shown in FIGS. 2-4 and the like, an example is shown in which the first inner circumferential region 101 of the rotary surface 8 completely overlaps the bearing surface part 31 in the axial direction, and the entirety of the first outer circumferential region 102 of the rotary surface 8 is located on the radially outer side of the bearing surface part 31.

However, the present invention is not limited to such embodiments. For example, a part of the first outer circumferential region 102 on the radially inner side may be disposed to overlap the bearing surface part 31 in the radial direction, and the first inner circumferential region 101 may be disposed on the radially inner side of the first outer circumferential region 102.

Moreover, another region (for example, a region having higher oleophobicity than the first outer circumferential region 102) may be disposed on the radially inner side of the first inner circumferential region 101.

Figure 6:
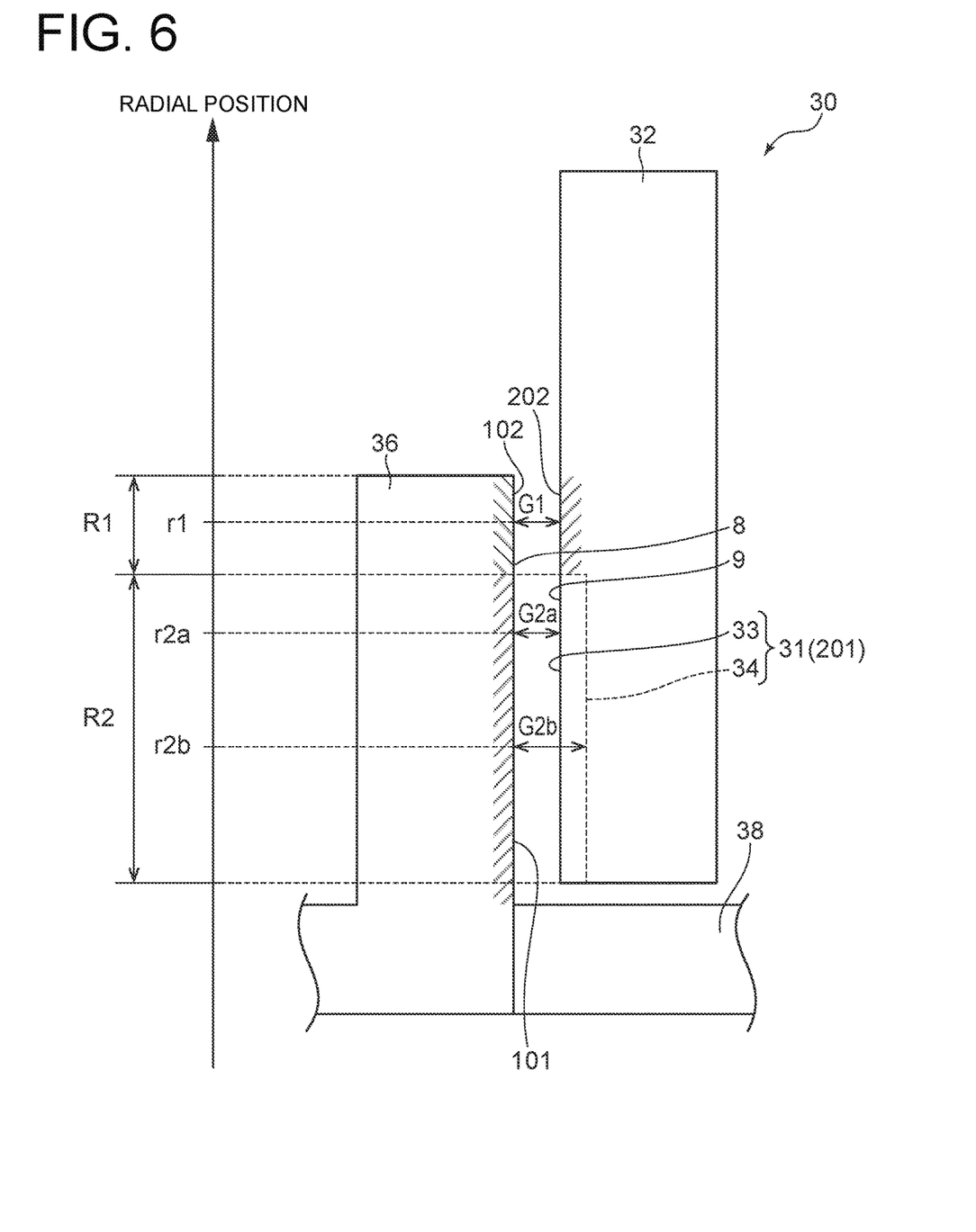
FIG. 6 is a partial enlarged view of the thrust bearing device shown in FIG. 2.

FIG. 6 is a partial enlarged view of the thrust bearing device 30 shown in FIG. 2.

In some embodiments, the thrust bearing device 30 satisfies $G1 \leq G2$, where G1 is a size of a gap between the rotary surface 8 and the stationary surface 9 at a first position r1 in a radial range R1 of the first outer circumferential region 102, and G2 (G2a, G2b of FIG. 6) is a size of a gap between the rotary surface 8 and the stationary surface 9 at a second position r2 (r2a, r2b of FIG. 6) in a radial range R2 of the bearing surface part 31. r2a in FIG. 6 is the second position of the bearing surface part 31 at the position of the land portion 33, and r2b in FIG. 6 is the second position of the bearing surface part 31 at the position of the tapered portion 34.

Moreover, in some embodiments, the above-described size G1 of the gap at the whole first position r1 in the above-described radial range R1 and the above-described size G2 of the gap at the whole second position r2 in the above-described radial range R2 may satisfy G1≤G2.

The size G1 of the gap between the rotary surface 8 and the stationary surface 9 at the first position r1 in the radial range R1 of the first outer circumferential region 102 is thus set not greater than the size G2 of the gap at the second position r2 in the radial range R2 of the bearing surface part 31, it is possible to reduce outflow (above-described side flow) of the oil from the first outer circumferential region 102 to the radially outer side more reliably, and thus it is possible to increase the load capacity of the thrust bearing device 30.

In some embodiments (see FIG. 2 and the like) in which the bearing surface part 31 is disposed on the side of the stationary surface 9, in a portion of the rotary surface 8 facing the bearing surface part 31, the percentage of an area which is occupied by a portion having lower oleophobicity than the first outer circumferential region 102 may be at least 75% and at most 90%. In the illustrated embodiment, the portion of the rotary surface 8 facing the bearing surface part 31 overlaps the first inner circumferential region 101.

In some embodiments (not shown) in which the bearing surface part 31 is disposed on the side of the rotary surface 8, in the bearing surface part 31 of the rotary surface 8, the percentage of an area which is occupied by a portion having lower oleophobicity than the first outer circumferential region 102 may be at least 75% and at most 90%.

Thus causing, of the rotary surface 8, a large part of the bearing surface part 31 or the portion facing the bearing surface part 31 to have relatively low oleophobicity, the flow of the oil in the rotational direction is hardly impaired in this region. Thus, the amount of the oil flowing in the rotational direction is ensured in the bearing surface part 31, making it possible to effectively suppress a decrease in the load capacity of the bearing.

Figure 7:
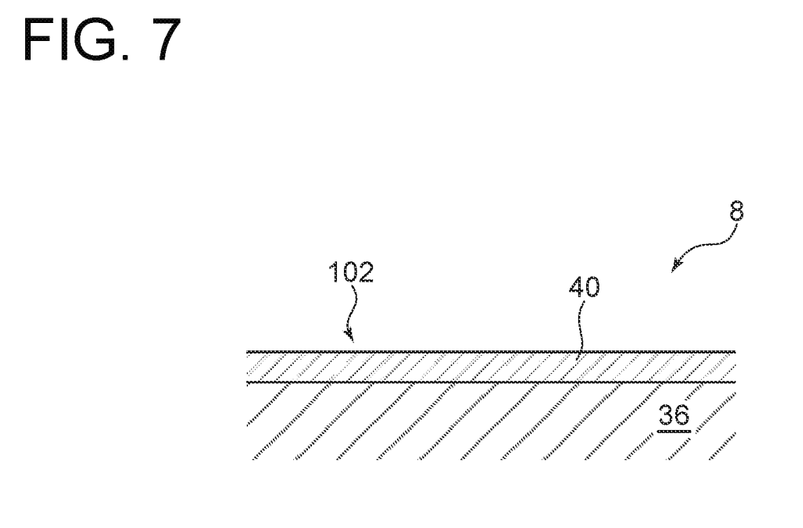
FIG. 7 is an enlarged schematic view of a surface of a rotary surface of the thrust bearing device according to an embodiment.
Figure 8A:
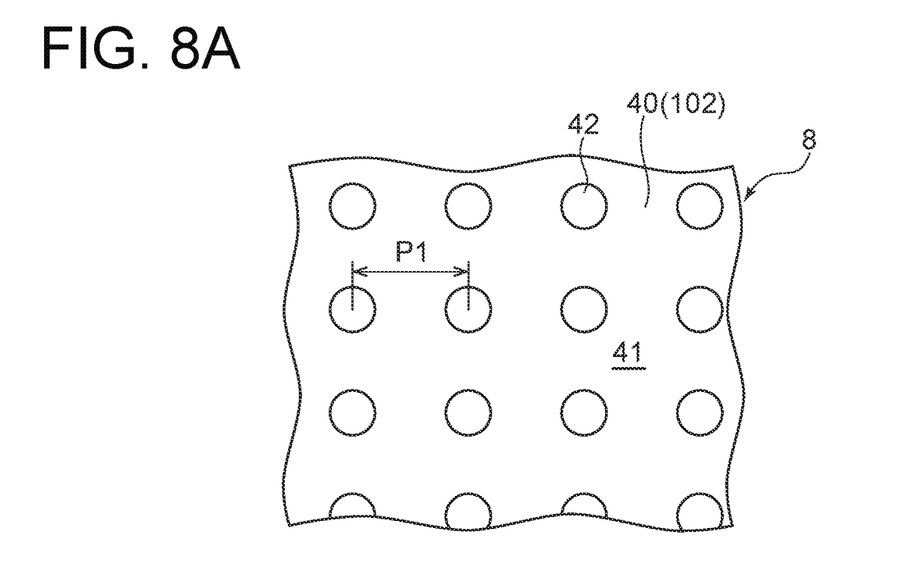
FIG. 8A is an enlarged schematic view of the surface of the rotary surface of the thrust bearing device according to an embodiment.
Figure 8B:
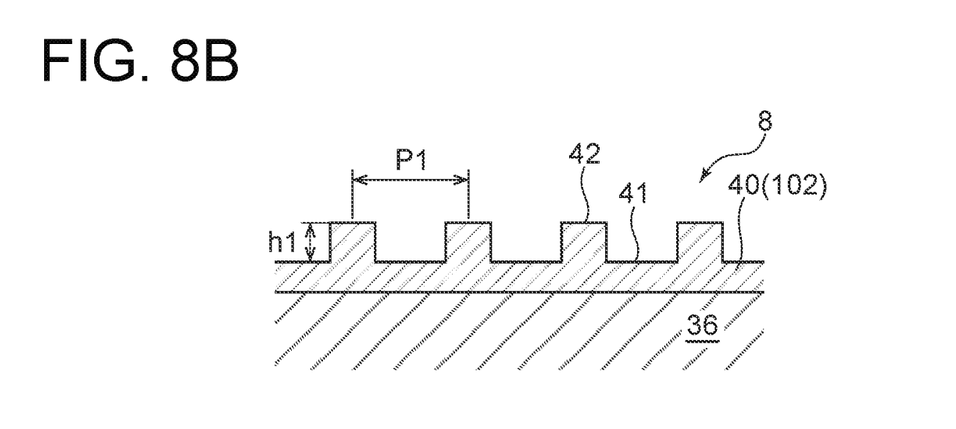
FIG. 8B is an enlarged schematic view of the surface of the rotary surface of the thrust bearing device according to an embodiment.

FIGS. 7, 8A, and 8B are enlarged schematic views each showing the surface of the rotary surface 8 of the thrust bearing device 30 according to some embodiments. FIGS. 7 and 8B are each a cross-sectional view of the rotary surface 8, and FIG. 8A is a view of the rotary surface 8 as viewed from the radial direction.

In some embodiments, for example, as shown in FIGS. 7 and 8A, 8B, the first outer circumferential region 102 includes an oleophobic film 40 disposed on the surface of the rotary surface 8.

Thus disposing the oleophobic film on the surface of the rotary surface 8, it is possible to give oleophobicity to the first outer circumferential region 102, making it possible to reduce side flow of the oil from between the rotary surface 8 and the stationary surface 9, and to reduce the velocity gradient of the oil in the first outer circumferential region 102. Thus, it is possible to increase the load capacity of the thrust bearing device 30 while reducing the bearing loss.

As a material for the oleophobic film 40, it is possible to use, for example, a fluorine coating agent such as a fluorine resin.

If the rotary surface 8 is made of a metal, the oleophobic film 40 may directly be formed on the surface of the rotary surface 8, or the surface of the rotary surface 8 may be treated with an oxidizing agent to form an oxide film, and then the oleophobic film 40 may be formed on the surface of the oxide film.

In the exemplary embodiment shown in FIG. 7, the oleophobic film 40 has a flat surface.

In the exemplary embodiment shown in FIG. 8A, 8B, the oleophobic film 40 has a flat portion 41 and a plurality of first protruding portions 42 axially protruding from the flat portion 41. Then, a ratio P1/h1 of a pitch P1 (see FIG. 8A, 8B) of the plurality of first protruding portions 42 to a height h1 (see FIG. 8B) of the plurality of first protruding portions 42 is at least 1.0 and at most 2.0.

In general, in a case where a contact angle of oil with respect to a surface is relatively large (for example, not less than 90 degrees), if the surface is made uneven, the oil enters a recess, increasing an apparent contact angle, and thus increasing oleophobicity of the surface. In this regard, in the above-described embodiment, since the plurality of first protruding portions 42 are formed on the surface of the oleophobic film 40, and the ratio P1/h1 of the pitch P1 to the height h1 of the first protruding portions 42 is set at least 1.0 and at most 2.0, the oil easily enters the flat portion 41 surrounded by the plurality of first protruding portions 42, increasing an apparent contact angle of the oil in the first outer circumferential region 102. Thus, by further increasing oleophobicity of the first outer circumferential region 102 provided with the oleophobic film 40, it is possible to effectively reduce the above-described side flow and to effectively reduce the velocity gradient of the oil in the first outer circumferential region 102.

The plurality of first protruding portions 42 may be arranged in a grid pattern as shown in FIG. 8A, for example, or may be arranged in a staggered pattern, or may be arranged irregularly.

Moreover, in some embodiments, a ratio P1_ave/h1_ave of an average P1_ave of the pitches P1 of the plurality of first protruding portions 42 to an average h1_ave of the heights of the plurality of first protruding portions 42 may be at least 1.0 and at most 2.0.

In some embodiments, the percentage of an area of the oleophobic film 40 occupied by the plurality of first protruding portions 42 (that is, the percentage of an area, of a total area as the oleophobic film 40 is viewed in the axial direction (see FIG. 8A), occupied by the plurality of first protruding portions 42) is at least 1% and at most 20%.

Thus setting the percentage of the area of the oleophobic film 40 occupied by the plurality of first protruding portions 42 at at least 1% and at most 20%, it is possible to reduce the above-described side flow of the oil more effectively and to reduce the velocity gradient of the oil in the first outer circumferential region 102 more effectively.

In some embodiments, for example, as shown in FIGS. 2 and 4, the stationary surface 9 (the surface of the thrust plate 32 in the illustrated embodiments) includes the second inner circumferential region 201, and the second outer circumferential region 202 facing the rotary surface 8 on the radially outer side of the bearing surface part 31 and having higher lipophilicity than the second inner circumferential region 201.

Thus causing, of the stationary surface 9, the second outer circumferential region 202 facing the rotary surface 8 on the radially outer side of the bearing surface part 31 to have lipophilicity, the oil is easily collected on the stationary surface 9 in the second outer circumferential region 202. The oil thus collected in the second outer circumferential region 202 functions as a wall for blocking the flow of the oil trying to flow out of the bearing surface part 31 radially outward. Thus, the amount of the oil flowing in the rotational direction is ensured in the bearing surface part 31, making it possible to effectively suppress the decrease in load capacity of the bearing.

Figure 9A:
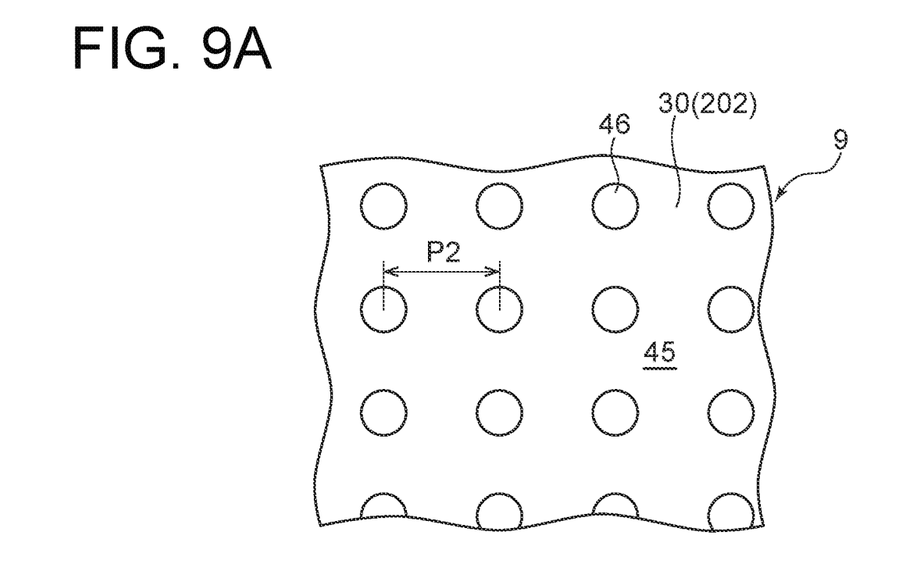
FIG. 9A is an enlarged schematic view of a surface of a stationary surface of the thrust bearing device according to an embodiment.
Figure 9B:
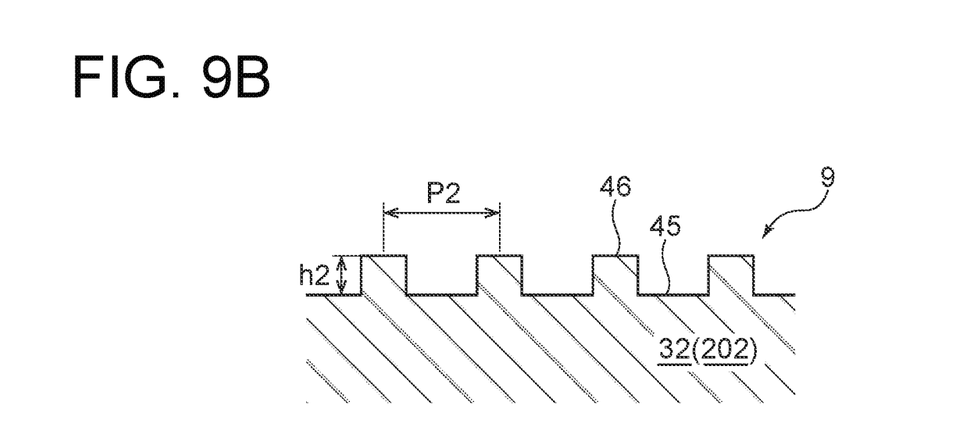
FIG. 9B is an enlarged schematic view of a surface of the stationary surface of the thrust bearing device according to an embodiment.
Figure 10:
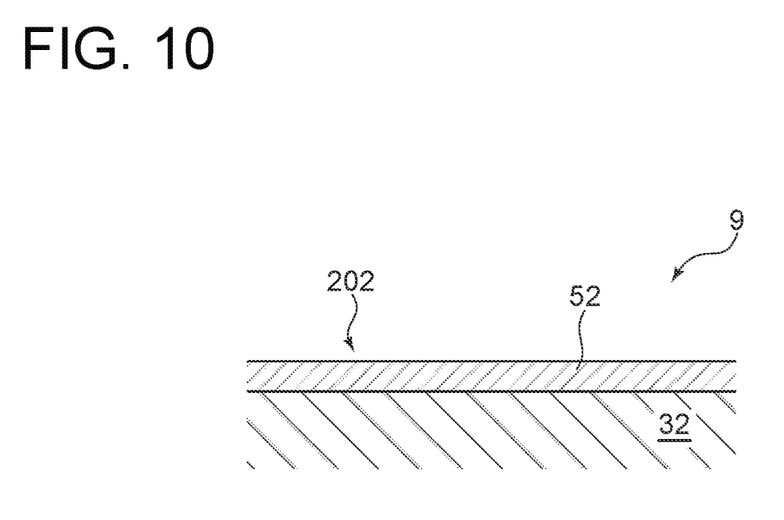
FIG. 10 is an enlarged schematic view of the surface of the stationary surface of the thrust bearing device according to an embodiment.

FIGS. 9A, 9B, and 10 are enlarged schematic views each showing the surface of the stationary surface 9 according to some embodiments. FIG. 9A is a view of the stationary surface 9 as viewed in the radial direction, and FIGS. 9B and 10 are each a cross-sectional view of the stationary surface 9.

In some embodiments, for example, as shown in FIG. 9A, 9B, the second outer circumferential region 202 has a flat portion 45 and a plurality of second protruding portions 46 axially protruding from the flat portion 45. Then, a ratio $P2/h2$ of a pitch P (see FIG. 9A, 9B) 2 of the plurality of second protruding portions 46 to a height h2 (see FIG. 9B) of the plurality of second protruding portions 46 is at least 1.0 and at most 2.0.

In general, in a case where a contact angle of oil with respect to a surface is relatively small (for example, less than 90 degrees), if the surface is made uneven, the oil enters a recess, decreasing an apparent contact angle, and thus increasing lipophilicity of the surface. In this regard, in the above-described embodiment, since the plurality of second protruding portions 46 are formed on the surface of the second outer circumferential region 202, and the ratio $P2/h2$ of the pitch P2 to the height h2 of the second protruding portions 46 is set at least 1.0 and at most 2.0, the oil easily enters the flat portion 45 surrounded by the plurality of second protruding portions 46, decreasing an apparent contact angle of the oil in the second outer circumferential region 202, making it possible to give lipophilicity to the second outer circumferential region 202. Thus, the amount of the oil flowing in the rotational direction is ensured in the bearing surface part 31, making it possible to effectively suppress the decrease in load capacity of the bearing.

The plurality of second protruding portions 46 may be arranged in a grid pattern as shown in FIG. 9A, for example, or may be arranged in a staggered pattern, or may be arranged irregularly.

Moreover, in some embodiments, a ratio $P2\_ave/h2\_ave$ of an average $P2\_ave$ of the pitches P2 of the plurality of second protruding portions 46 to an average $h2\_ave$ of the heights of the plurality of second protruding portions 46 may be at least 1.0 and at most 2.0.

In some embodiments, for example, as shown in FIG. 10, the second outer circumferential region 202 may include a lipophilic film 52 disposed on the surface of the stationary surface 9. The lipophilic film 52 may have a flat surface, for example, as shown in FIG. 10. Alternatively, in the lipophilic film 52 disposed on the surface of the stationary surface 9, for example, the flat portion 45 and the second protruding portions 46 as shown in FIG. 9A, 9B may be formed.

Thus disposing the lipophilic film 52 on the surface of the stationary surface 9, it is possible to give lipophilicity to the second outer circumferential region 202. Thus, the amount of the oil flowing in the rotational direction is ensured in the bearing surface part 31, making it possible to effectively suppress the decrease in load capacity of the bearing.

As a material for the lipophilic film, it is possible to use, for example, a coating agent containing silicone oil.

If the stationary surface 9 is made of a metal, the lipophilic film may directly be formed on the surface of the stationary surface 9, or the surface of the stationary surface 9 may be treated with an oxidizing agent to form an oxide film, and then the lipophilic film may be formed on the surface of the oxide film.

Embodiments of the present invention were described in detail above, but the present invention is not limited thereto, and also includes an embodiment obtained by modifying the above-described embodiments and an embodiment obtained by combining these embodiments as appropriate.

Further, in the present specification, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, an expression of a shape such as a rectangular shape or a cylindrical shape shall not be construed as only the geometrically strict shape, but also includes a shape with unevenness or chamfered corners within the range in which the same effect can be achieved.

As used herein, the expressions "comprising", "including" or "having" one constitutional element is not an exclusive expression that excludes the presence of other constitutional elements.

REFERENCE SIGNS LIST

1 Turbocharger
2 Rotational shaft
4 Compressor impeller
6 Turbine impeller
8 Rotary surface
9 Stationary surface
10 Compressor housing
12 Turbine housing
14 Bearing housing
16 Air inlet
18 Annular flow passage
20 Exhaust gas outlet
22 Annular flow passage
24 Radial bearing device
26 Lubricant-oil supply passage
27 Oil drain space
28 Oil discharge port
30 Thrust bearing device
31 Bearing surface part
32 Bearing plate
33 Land portion
34 Tapered portion
36 Thrust collar
38 Thrust collar
39 Oil supply passage
40 Oleophobic film
41 Flat portion
42 First protruding portion
45 Flat portion 46 Second protruding portion
50 Bearing oil film
52 Lipophilic film
101 First inner circumferential region
102 First outer circumferential region
201 Second inner circumferential region
202 Second outer circumferential region
O Rotational axis
P Pitch
R1 Radial range
R2 Radial range
h Height
r1 First position
r2 Second position

The invention claimed is:

1. A bearing device, comprising:
   a rotary part which is configured to be rotatable about a rotational axis and has a rotary surface intersecting the rotational axis; and
   a stationary part which has a stationary surface facing the rotary surface,
   wherein one of the rotary surface or the stationary surface includes a bearing surface part for forming a bearing oil film, and
   wherein the rotary surface includes:
     a first inner circumferential region; and
     a first outer circumferential region facing the stationary surface on a radially outer side of the bearing surface part and having higher oleophobicity than the first inner circumferential region, and
   wherein the stationary surface includes:
     a second inner circumferential region; and
     a second outer circumferential region facing the rotary surface on a radially outer side of the baring surface part and having higher lipophilicity than the second inner circumferential region, and
   wherein the first outer circumferential region and the second outer circumferential region face each other.

2. The bearing device according to claim 1,
   wherein the bearing device satisfies G1≤G2, where G1 is a size of a gap between the rotary surface and the stationary surface at a first position in a radial range of the first outer circumferential region, and G2 is a size of a gap between the rotary surface and the stationary surface at a second position in a radial range of the bearing surface part.

3. The bearing device according to claim 1,
   wherein the first inner circumferential region of the rotary surface is disposed to be adjacent to the bearing oil film in an axial direction.

4. The bearing device according to claim 1,
   wherein, in the bearing surface part of the rotary surface or a in portion of the rotary surface facing the bearing surface part, a percentage of an area which is occupied by a portion having lower oleophobicity than the first outer circumferential region is at least 75%.

5. The bearing device according to claim 1,
   wherein the first outer circumferential region includes an oleophobic film disposed on a surface of the rotary surface.

6. The bearing device according to claim 5,
   wherein the oleophobic film includes a plurality of first protruding portions protruding in the axial direction, and
   wherein a ratio P1/h1 of a pitch P1 of the plurality of first protruding portions to a height h1 of the plurality of first protruding portions is at least 1.0 and at most 2.0.

7. The bearing device according to claim 6,
   wherein, of the oleophobic film, a percentage of an area occupied by the plurality of first protruding portions is at least 1% and at most 20%.

8. The bearing device according to claim 1,
   wherein the second outer circumferential region includes a plurality of second protruding portions protruding in the axial direction, and
   wherein a ratio P2/h2 of a pitch P2 of the plurality of second protruding portions to a height h2 of the plurality of second protruding portions is at least 1.0 and at most 2.0.

9. The bearing device according to claim 1,
   wherein the second outer circumferential region includes a lipophilic film disposed on a surface of the stationary surface.

10. A turbocharger, comprising:
    the bearing device according to claim 1;
    a rotational shaft rotatably supported by the bearing device; and
    a compressor impeller and a turbine impeller disposed on the rotational shaft.

* * * * *